United States Patent [19]

Martin

[11] Patent Number: 5,174,009
[45] Date of Patent: Dec. 29, 1992

[54] APPARATUS FOR FORMING A STACK OF INTERLOCKED LAMINATIONS THAT CAN BE USED AS A ROTOR IN AN ELECTRIC MOTOR

[76] Inventor: Benson D. Martin, 1015 Golf Dr., Pontiac, Mich. 48341

[21] Appl. No.: 740,600

[22] Filed: Aug. 5, 1991

[51] Int. Cl.⁵ .......................................... H02K 15/02
[52] U.S. Cl. .................................. 29/564.6; 29/598; 29/732; 29/738; 29/609
[58] Field of Search ............... 29/598, 596, 732, 736, 29/738, 609, 564.6

[56] References Cited

U.S. PATENT DOCUMENTS

| | | | |
|---|---|---|---|
| 4,110,895 | 9/1978 | Mitsui | 29/564 |
| 4,738,020 | 4/1988 | Neuenschwander | 29/598 |
| 4,979,285 | 12/1990 | Martin | 29/598 |

Primary Examiner—Carl E. Hall
Attorney, Agent, or Firm—Charles W. Chandler

[57] ABSTRACT

An apparatus for forming a stack of interlocked laminations (disks) that can be used as a rotor in an electric motor. Each disk is severed from a metal sheet that is passed horizontally through a die apparatus. The severed disks are sequentially driven downwardly into a vertical die opening having an upper diameter chosen to grip the disk edges, as a stack is being formed. The lower end of the stack advances into an expandable rotatable collet. When the stack has passed below the upper end of the die opening, the collet is opened to drop the completed stack to a conveyor.

A sensor device detects the lowest disk in the descending stack. A signal generated by the sensor device is used to determine the number of disks necessary to finish the stack by dividing the unfinished height of the stack by the thickness of the advancing metal sheet.

11 Claims, 2 Drawing Sheets

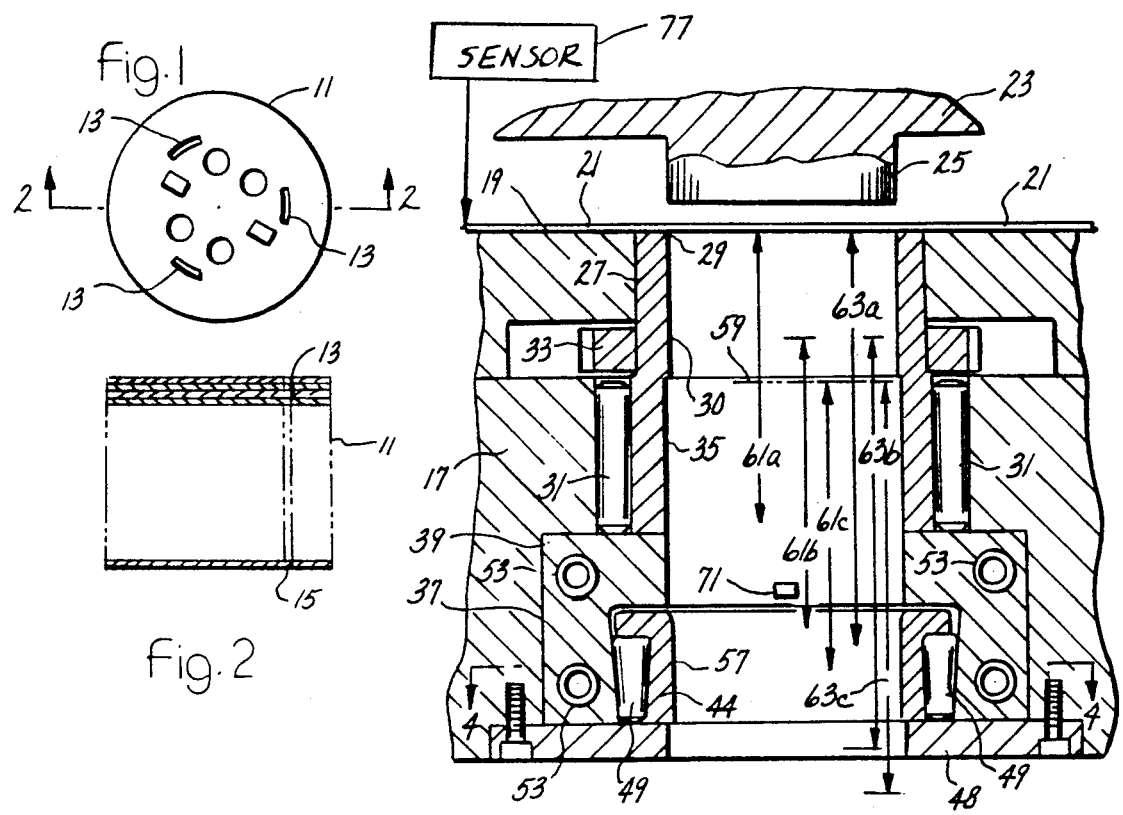
fig. 1
fig. 2
fig. 3
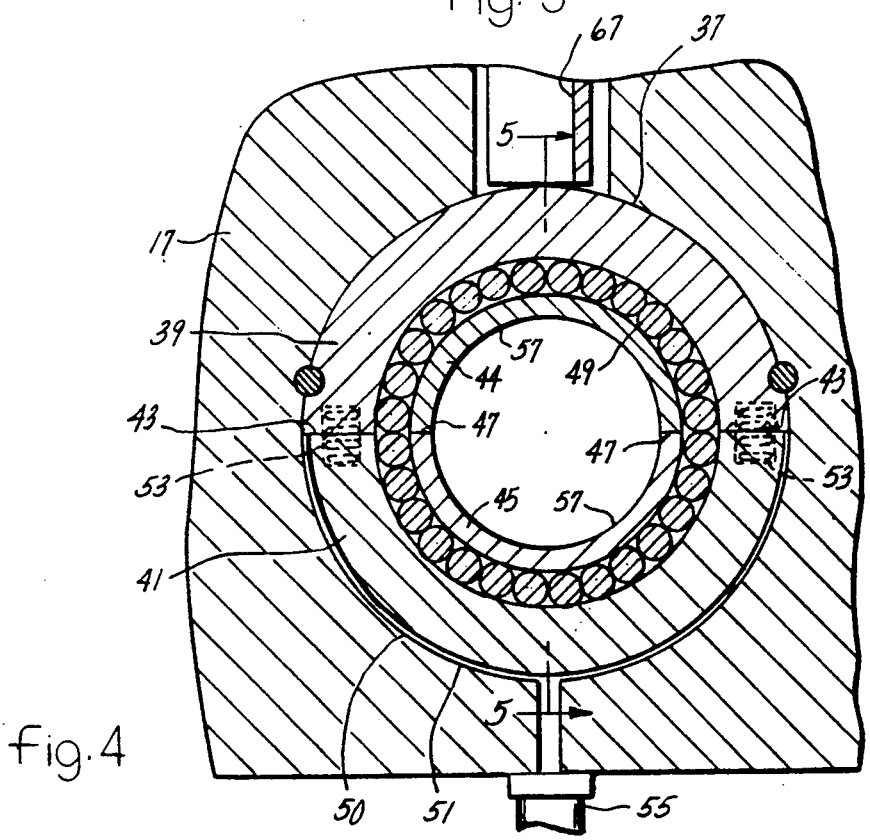
fig. 4

APPARATUS FOR FORMING A STACK OF INTERLOCKED LAMINATIONS THAT CAN BE USED AS A ROTOR IN AN ELECTRIC MOTOR

BACKGROUND AND SUMMARY OF THE INVENTION

This invention relates to an apparatus for forming a stack of interlocked laminations, e.g. a laminated cylindrical rotor for an electric motor.

Yoshiaki Mitsui U.S. Pat. No. 4,110,895 shows an apparatus for forming and stacking interlockable lamination disks into a cylindrical rotor configuration. The Mitsui apparatus comprises a stationary die structure, and an overhead die structure which is lowered to pierce a strip of material that is indexed along the upper surface of the stationary die structure. The movable die structure includes a circular male die (punch) that is lowered into a chute structure in the stationary die structure to form and sever a circular disk from the strip material during each downstroke of the male die. The circular disks are successively driven downwardly into the chute structure to form a stack.

The chute structure has a female die opening sized to grip the edge of the encircled lamination, whereby successive lamination (disks) tend to remain in face-to-face contact for promotion of interlocking connections between mating projections and holes formed on the opposed disk surfaces. The contact between adjacent laminations is facilitated by a lower support means carried on the piston rod of a vertically-oriented air cylinder. At a predetermined point in the cycle, the air cylinder is operated to compress the stack, thereby achieving (or maintaining) a press fit interlock between the disk projections and mating holes.

A problem with this stacking arrangement arises from the large stacks now required for modern rotors. A large stack results in a heavy, lower end of the stack that is suspended by the interlocking projections on the lowermost disk of the stack gripped in the chute.

During press operations, the impact forces of the punch, and certain rotational forces associated with maintaining parallelism between the laminations, tend to separate the connections between adjacent laminations in the suspended stack. The suspended, lower end of the stack tends to weaken the connections between laminations, as the suspended end increases in height.

The present invention contemplates a different arrangement wherein the lower end of the stack is compressed in a rotatable collet until the stack is dropped from the chute structure. This is advantageous in that the connections between laminations are complete and fully effective. Also, the lamination stack height is maintained without gaps between the laminations.

In carrying out the invention, the collet is adjustable between a first condition wherein its side surfaces grip the edges of the stacked laminations, and a second condition wherein the collet releases the edges of the stack. As the stack is being pushed down through the die, the suspended end of the stack approaches the collet and then is forced through the collet opening. The collet provides vertical support for the stack. When the upper end of the stack has advanced below the die opening, the collet is opened to release the stack, which then drops to a conveyor.

Another feature of the invention addresses the problem of producing a stack of a precise height. The conventional approach is to measure the strip thickness, and then to divide the stack height by the strip thickness to determine the number of disks in the stack. This process is sometimes inaccurate because the strip thickness varies, and the means for measuring the strip thickness is not precise.

The stacking apparatus of the present invention includes a lamination sensing device located a slight distance above the collet for detecting the presence of the lowermost lamination in the downwardly advancing stack. The sensor signal indicates that the stack height corresponds to the distance from the lowermost disk to a reference point at the top portion of the disk opening. The strip thickness is then measured to determine the disks necessary to complete the stack. The overall stack height is more accurate because the partial height of the stack that depends upon measuring the strip thickness is reduced.

THE DRAWINGS

FIG. 1 is a top plan view of a stack of laminations formed by an apparatus of the present invention.

FIG. 2 is a sectional view taken essentially on line 2—2 in FIG. 1.

FIG. 3 is a fragmentary sectional view taken through the preferred apparatus.

FIG. 4 is a transverse sectional view taken on line 4—4 in FIG. 3.

DESCRIPTION OF A PREFERRED EMBODIMENT OF THE INVENTION

Figure 5:
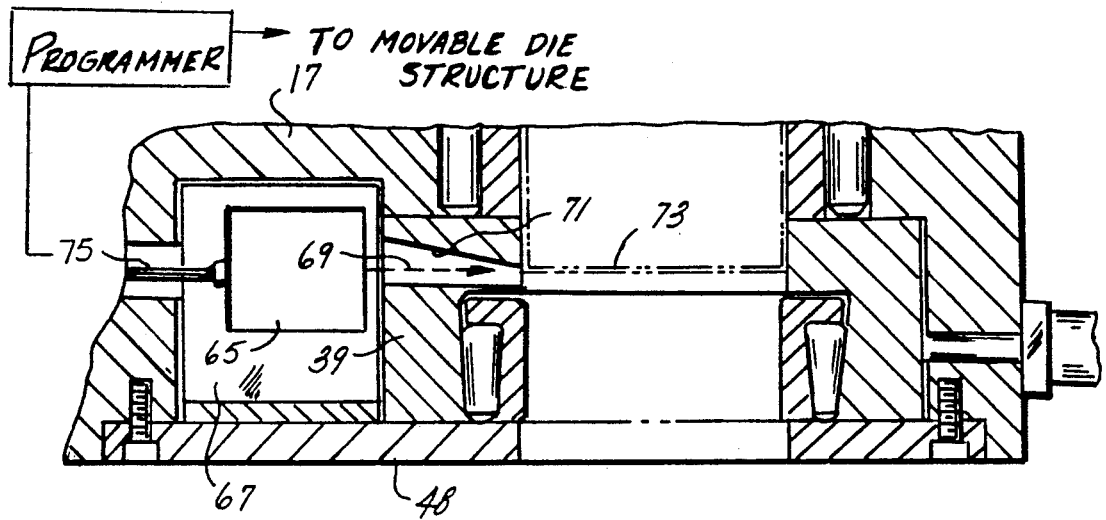
FIG. 5 is a sectional view taken on line 5—5 in FIG. 4.

FIGS. 1 and 2 show a stack of circular metal disks laminated together to form a cylindrical stack 11. In an illustrative stack construction, each metal disk can have a thickness of about 0.025 inch and a diameter of three inches. The axial height of the stack can vary according to the environment in which it is to be used. When the cylindrical stack is to be used as the rotor of a small electrical motor, the stack height can typically be about four to six inches (depending on the motor design).

The individual laminations can be connected together by multiple projections deformed out of the lamination plane so that each projection forms a similarly shaped hole or depression in the other face of the lamination. When the lamination disks are brought into facial contact with each other, the disk projections are press fit in the mating holes of adjacent disks to thereby connect the lamination (disks) together. In the drawings the projections are designated by numerals 13; each disk has three such projections. The lowermost disk in the stack is punched completely through at points corresponding to projections 13, such that mating holes 15 are formed in the lowermost disk (for press fit reception of the three projections in the next disk). A laminated stack embodying the mating projection-hole feature is shown in greater detail in U.S. Pat. No. 4,979,285.

An apparatus for forming the lamination stack is shown fragmentarily in FIGS. 3 and 4. A lower die structure 17 has an upper surface 19 adapted to support a strip of metallic (steel) sheet material 21 for indexing movement in a left-to-right direction. An upper die structure 23 is arranged for vertical reciprocatory motion to form various holes and slots in sheet 21 after each indexed motion of the strip. In FIG. 3, these operations are performed at stations to the left of the illustrated structure. FIG. 3 illustrates a station wherein circular sections are punched out of the strip material and forced downwardly into a chute structure that constitutes part of die structure 17.

Upper die structure 23 includes a cylindrical male die (punch) 25 movable downwardly to sever a circular disk from strip 21. A female die member 27 is carried within structure 17 and has a circular die opening 29 having essentially the same diameter as punch 25. The disk cut out of strip 21 is pushed downwardly into a chute defined by internal circular surface 30 of die member 27.

Each disk entering the chute structure forces the next lower disk downwardly into the chute by an incremental distance corresponding to the disk thickness, typically 0.025 inch. Repeated downstrokes of punch 25 form a lamination stack. The vertical length of the chute structure is greater than the vertical height of a given stack. The demarcation (separation) between stacks in the chute can be achieved by operating the die apparatus so that periodically the punch that forms projections 13 is adjusted (elongated) to produce through holes 15 (FIG. 2) that constitute the bottom disk in a given lamination stack. Alternately, the upper face of the female die can be elevated slightly so that the punch pierces completely through the metal strip. Each bottom disk is devoid of projections, such that it can separate from the next lower disk in the chute.

Figure 6:
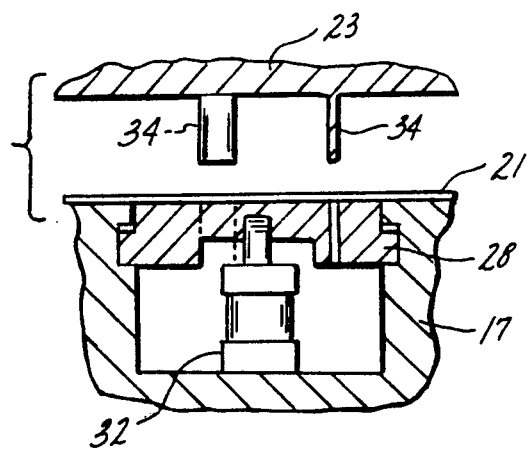
FIG. 6 is a fragmentary sectional view of a die apparatus that can be used in practice of the invention.

FIG. 6 illustrates one way of operating a punch apparatus for forming projections 13 or holes 15 in strip 21. A female die member 28 is adjustably mounted in die structure 17 so that it can be raised a slight distance by fluid cylinder 32 when it is desired to form holes in strip 21. In its illustrated position, die member 28 forms three projections in the strip during each downstroke of die structure 23. The cooperating punch elements are designated by numeral 34. During each downstroke of structure 23, the punch elements form projections or holes in strip 21, depending on the adjusted position of die member 28.

Female die member 27 (FIG. 3) is rotatably mounted within support means 17 via a ring of needle bearings 31. A ring gear 33 is carried by die member 27 for driven engagement with a rack or toothed belt (not shown) for rotatably repositioning the die member after each downstroke of punch 25. Such repositioning is for the purpose of rotatably offsetting adjacent disks in the stack, to minimize non-parallelism effects that could be introduced due to thickness variations in or along the disk material. U.S. Pat. No. 4,738,020 contains a discussion of this effect.

Female die element 27 has an upper cylindrical surface (section) 30 with a diameter adapted to grip the edge of the encircled disk, and a lower cylindrical surface (section) 35 with a diameter slightly larger than the disk diameter. The chute structure includes a lower chute mechanism (or collet) 37 axially aligned with die element 27 for conjointly supporting the lower end of the stack. Chute mechanism 37 is not directly connected to die element 27.

Chute mechanism 37 is in the nature of a split bearing device having an outer non-rotating split race, and an inner rotating split race. The inner cylindrical surface of the rotating race has a diameter adapted to the edge of the encircled disk so as to rotate with the stack in synchronism with upper die element 27. The outer race of chute mechanism 37 comprises a fixed semi-circular section 39 and a radially movable (adjustable) semi-circular section 41. The two sections are split along an axial plane 43 extending vertically through the chute axis.

The inner race portion of chute mechanism 37 comprises two semi-circular race sections 44 and 45, split on a radial plane 47. The inner race could be split into three similar race sections if so desired. Anti-friction elements 49 are arranged in a ring pattern between the inner race and the outer race, whereby the inner race can rotate freely relative to the outer race. The outer race is fixed against rotary motion. A retainer plate 48 prevents downward dislocation of structure 37.

As shown in FIG. 4, a slight clearance 51 exists between the outer surface of movable race section 41 and the adjacent surface 50 of support means 17. This clearance enables race sections 41 to be retracted radially away from race section 39 under the bias of compression springs 53. Normally race section 41 is urged to its illustrated position by a fluid cylinder means 55 (or some other controllable power device).

When the outer race (sections 39 and 41) is in its illustrated position, the inner surface 57 of the inner race is adapted to grip the edges of the stack of disks. When fluid cylinder means 55 is actuated to permit springs 53 to move race section 41 away from race section 39, the inner race opens to a diameter greater than the disk diameter, thereby releasing the stack from the collet. Such actuation of the fluid cylinder means is timed to occur when the uppermost lamination in the stack is located below radial plane 59 defined by a shoulder formed at the juncture between chute surfaces 30 and 35. In this position, the upper end of the stack is no longer gripped in the female die opening. As the stack lamination is released from chute mechanism 37 it falls by gravity through the chute structure onto an exit conveyor means, not shown. The cyclic operation of die structure 23 is continued to form another lamination stack.

While the lowermost disk in the stack is being gripped by chute mechanism 37, the stack is subjected to an axial compressing action because die (punch) 25 periodically drives a severed disk forcibly onto the upper face of the partially-formed stack. Therefore, when fluid cylinder means 55 is actuated to release the stack from the chute structure, the laminations are in close facial engagement in which the projections in each disk are fully locked within the mating holes in adjacent disks.

The apparatus may be used to form lamination stacks of varying heights. Numerals 61a, 61b and 61c indicate one stack at three stages. Numeral 61a shows the stack as initially formed. Numeral 61b shows the same stack at an intermediate position being compressed by lower chute mechanism 37. Numeral 61c shows the stack at the moment of its release from the chute structure. Three additional numerals 63a, 63b and 63c are included in the drawing to show corresponding conditions of a longer lamination stack.

The axial height of each lamination stack can be determined by various devices. For example, a proximity sensor 65 (FIG. 5) can be located to detect the lowermost lamination (in the still-forming stack) at a specific distance from the upper end of the chute structure. Energization of the sensor (by arrival of the lowermost disk at the sensor plane) generates an electrical signal that can be used to determine the number of disks necessary to complete the stack.

FIG. 5 illustrates a lamination non-contact sensing device 65 bolted or otherwise mounted on a vertical plate 67 that extends upwardly from retainer plate 48 within a cavity formed in die structure 17. The sensing device has an imaginary sight line 69 through a slot 71 in stationary race structure 39. When the lowermost disk in the downwardly-advancing stack reaches the position designated by numeral 73, the sensing device generates a control signal. An electrical line (cable) 75 extends leftwardly from the sensing device for transmission of the control signal to programmer 76 for controlling the movable die structure, and fluid cylinders 55 and 32.

Sensing device 65 can take various forms, e.g. an electric eye having a receiver for a light signal reflected from the edge of the lowermost lamination, an optical laser sensor (similar to a range finder), or an air-operated switch responsive to reflected air flow, or a magnetic proximity switch sensitive to the edge of the lowermost disk 73.

Sensing device 65 tells the programming apparatus that the stack has reached a predetermined height measured from the top lamination in the stack to the last lamination in the stack. The signal from the sensing device is used to control fluid cylinder 32 (FIG. 6) and fluid cylinder 55 (FIG. 4).

Fluid cylinder 55 is actuated a computed number of die cycles after sensing device 65 has generated a control signal, when the uppermost lamination in that particular stack has descended to plane 59. The number of die cycles is determined by the programmer. The strip thickness is detected by sensor 77 (FIG. 1). The difference between the height of the partially formed stack and the full stack height, is then divided by the sensed strip thickness to calculate the remaining punch cycles i.e. the remaining number of disks needed to finish the stack.

In the case of longer stacks (e.g. a six inch stack represented by numeral 63), the distance from sensing plane 69 to the upper end of the chute structure is less than the full stack height. The topmost lamination in the full stack is not yet in the chute structure at the time when sensing device 65 generates its control signal. The signal from the sensing device starts a counting process that delays the signal to fluid cylinder 32 until the calculated number of "new" laminations have been delivered into the chute structure. Fluid cylinder 55 is actuated when the last or topmost disk in the stack has descended to plane 59. The sensing device thereby tends to reduce errors in stack height caused by thickness variations in (along) strip 21.

The principal feature of this invention is the construction of chute mechanism or collet 37, whereby the lower, suspended end of the stack is compressed during the stack-formation process.

Another feature relates to sensing device 65, whereby the major height of a stack is controlled primarily by sensing the actual stack height. This feature minimizes errors that can arise due to thickness variations in the strip material used to form the laminations.

The drawings necessarily show one specific embodiment of the invention. However, it will be appreciated that the invention can be practiced in different structural configurations.

What is claimed is:

1. Apparatus for forming a stack of interlocked laminations, comprising means for supporting strip material; a male cutting die movable downwardly against the supported strip material to form an individual lamination; a female die that includes an upper chute, means rotatably positioned in said support means to receive and encircle an individual lamination, produced by the male die, and a lower chute means axially aligned with said upper chute means; said upper chute means and said lower chute means being adapted to conjointly support a stack of laminations; said upper chute means comprising an upper section adapted to grip the edges of the encircled laminations, and a lower section adapted to be spaced from the edges of the encircled laminations; said lower chute means being adjustable between a first condition adapted to grip the edges of the encircled laminations, and a second condition adapted to be spaced from the edges of the encircled laminations.

2. The apparatus of claim 1, and further comprising means for rotatably mounting said lower chute means within the support means, whereby the upper chute means and the lower chute means can rotate as a unit when the lower chute means is in its first condition.

3. The apparatus of claim 2, wherein said lower chute means comprising an inner race and an outer race; said inner race being freely rotatable within the outer race.

4. The apparatus of claim 3, wherein said outer race and said inner race are each split on axial planes extending vertically through the chute means axis.

5. The apparatus of claim 4, wherein said outer split race comprises a fixed section and a movable section, said movable race section being movable on a radial line toward or away from the fixed race section.

6. The apparatus of claim 5, and further comprising a power mechanism for moving said movable race section toward or away from the fixed race section.

7. The apparatus of claim 6, wherein said power mechanism comprises a fluid cylinder for moving the movable race section toward the fixed race section, and spring means for moving the movable race section away from the fixed race section.

8. The apparatus of claim 6, and further comprising rotary anti-friction elements arranged in a ring pattern between the outer race and the inner race.

9. The apparatus of claim 8, wherein the movable section of the outer race has a limited degree of motion toward or away from the fixed section of the outer race, whereby the anti-friction elements remain essentially undisturbed when the movable race section is spaced away from the fixed race section.

10. The apparatus of claim 6, and further comprising a retainer means carried by said support means for preventing downward dislocation of said inner race.

11. The apparatus of claim 1, and further comprising means for precisely controlling the height of a lamination stack, said height control means comprising a sensor for sensing the location of the lowermost lamination in a descending lamination stack.

* * * * *